United States Patent

Denton

[15] 3,675,405

[45] July 11, 1972

[54] MACHINE FOR HARVESTING AND CLEANING NUTS AND THE LIKE

[72] Inventor: John L. Denton, Rte 2, Box 776, Roseburg, Oreg. 97470

[22] Filed: Nov. 2, 1970

[21] Appl. No.: 86,021

[52] U.S. Cl. .............................. 56/328 R, 15/340, 15/347, 15/405, 56/12.9, 56/DIG. 8
[51] Int. Cl. .......................................................... A01g 19/00
[58] Field of Search ................ 56/12.8, 12.9, 328 R, 30, 330, 56/DIG. 8, 16.5, 327 A; 15/340, 347, 348, 405

[56] References Cited

UNITED STATES PATENTS

| | | | |
|---|---|---|---|
| 2,493,422 | 1/1950 | Sartiw | 56/30 |
| 2,639,573 | 5/1953 | McLaughlin | 56/328 R |
| 3,328,943 | 7/1967 | Marmorine et al. | 56/327 A |
| 2,679,133 | 5/1954 | Soderholm | 56/328 R |
| 3,562,845 | 9/1968 | Hayden | 15/405 X |
| 2,561,882 | 7/1951 | Patton | 15/405 |
| 2,682,742 | 7/1954 | Hiatt | 56/328 R |

FOREIGN PATENTS OR APPLICATIONS

| | | | |
|---|---|---|---|
| 129,129 | 8/1959 | U.S.S.R. | 56/DIG. 8 |

*Primary Examiner*—Antonio F. Guida
*Assistant Examiner*—J. A. Oliff
*Attorney*—Buckhorn, Blore, Klarquist & Sparkman

[57] ABSTRACT

Apparatus for harvesting and cleaning nuts and the like is mounted at the rear of a tractor and comprises a blower having a discharge conduit adapted to blow a stream of air in a direction normal to the path of travel of the tractor and generally parallel to the ground to entrain nuts and accompanying debris. A grid-like ramp is attached to the tractor and disposed in the air stream. A basket is mounted at the high end of the ramp and a backstop grid is positioned at the edge of the basket remote from the ramp. Nuts and debris entrained in the air stream are blown onto the ramp, the debris falling through the spaces in the grid while the nuts ride up the ramp and pass into the basket. The backstop prevents nuts from being blown over the basket.

9 Claims, 4 Drawing Figures

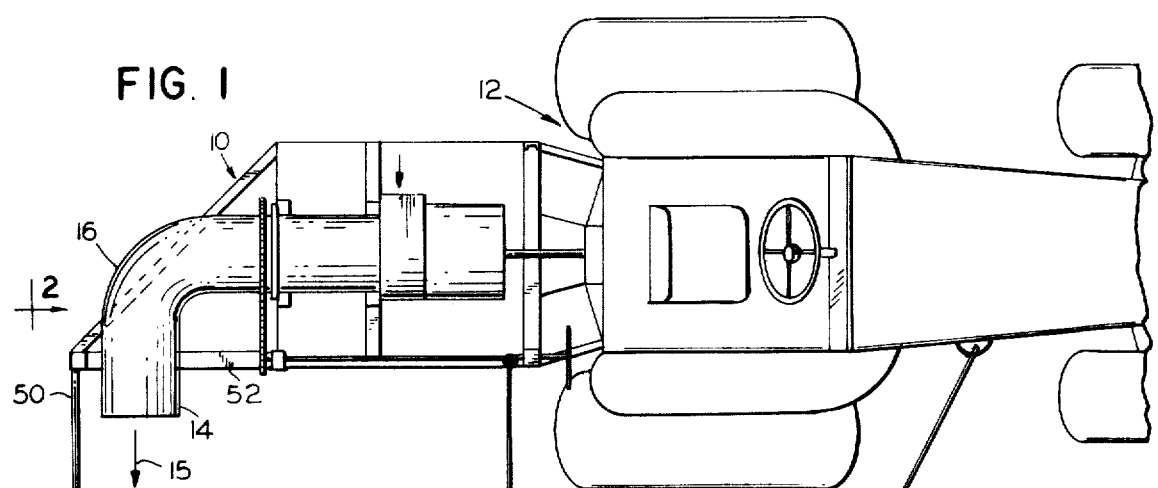
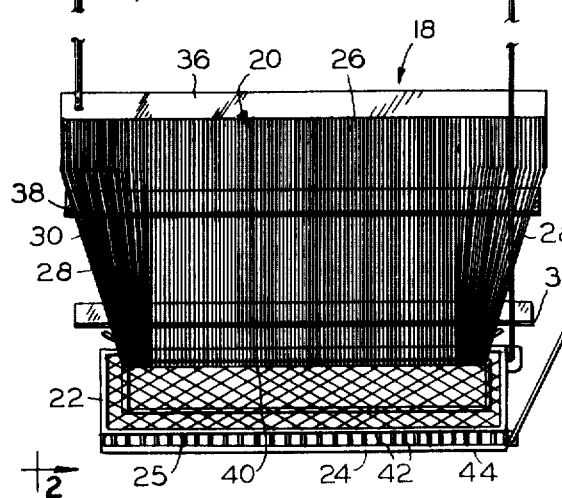
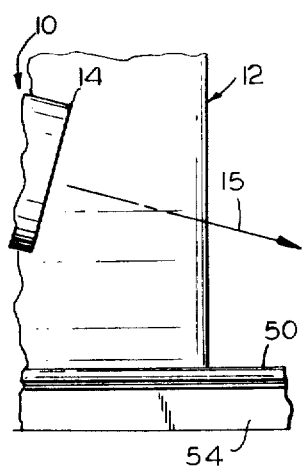

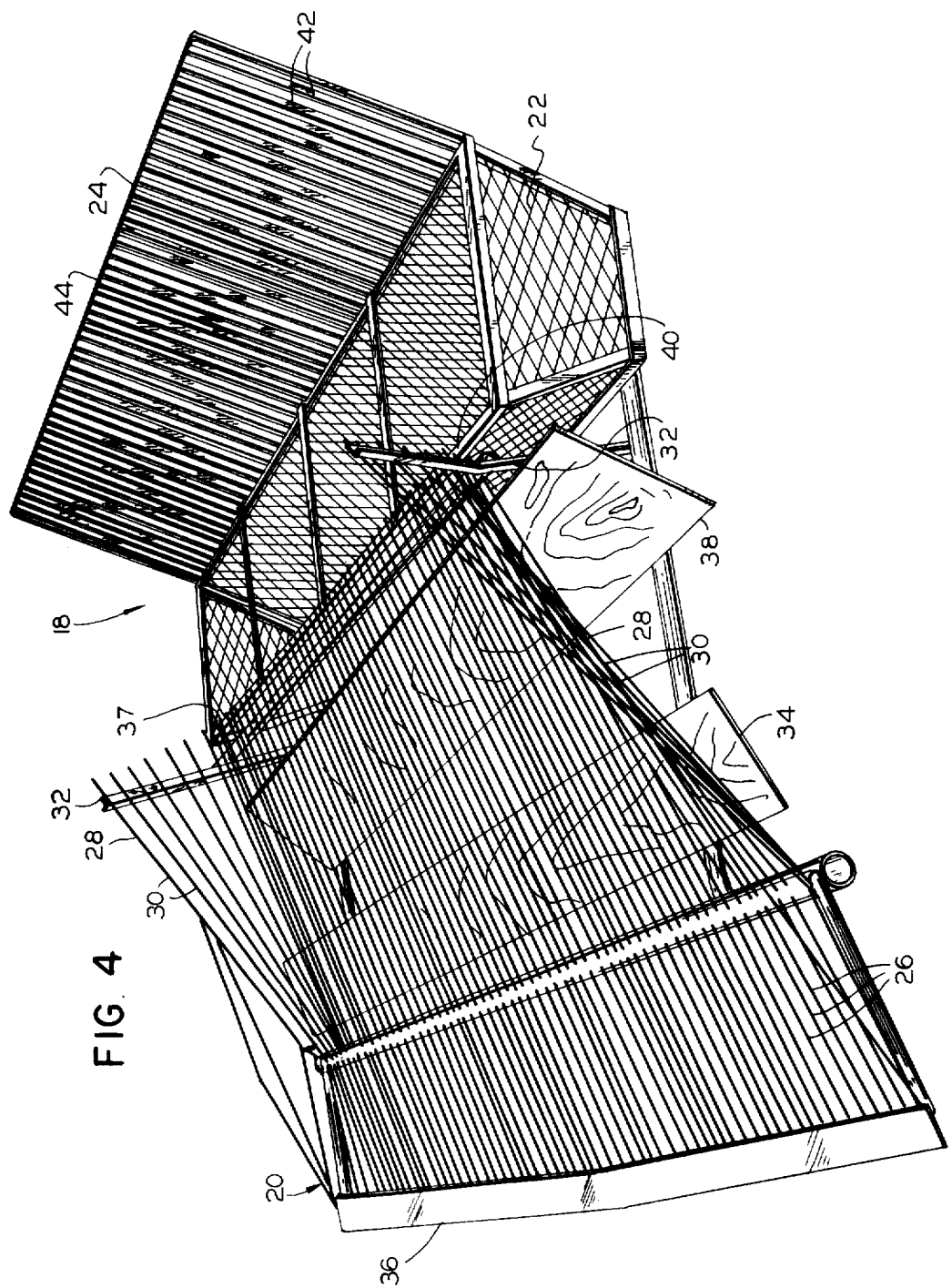

MACHINE FOR HARVESTING AND CLEANING NUTS AND THE LIKE

BACKGROUND OF THE INVENTION

This invention relates to the harvesting and cleaning of nuts and like products and, more particularly, to apparatus suitable for harvesting nuts in conditions of rain and mud.

Nut harvesting machinery presently available is generally heavy and cumbersome and, under the conditions which prevail in rainy climates, often gets bogged down or clogged with mud and debris. Most such apparatus utilizes sweepers, paddles or rubberlike fingers to elevate nuts to a position where cleaning devices can eliminate the debris which comes with them. The machinery required to achieve these functions often weighs several tons.

Accordingly, it is the primary object of the present invention to produce an efficient apparatus for both harvesting and cleaning nuts and like products.

It is a further object of the present invention to produce such an apparatus that will be light in weight and which will not require complicated machinery to separate the nuts from the accompanying debris.

It is a still further object of the present invention to provide such an apparatus that will be effective in rain and mud, harvesting conditions which heretofore have hindered the operation of prior apparatus.

SUMMARY OF THE INVENTION

My harvesting and cleaning apparatus uses a blast or stream of air to pick the nuts off the ground and transport them into a container, such air simultaneously removing large quantities of accompanying debris. As such, the apparatus comprises blower means adapted to blow a stream of air generally parallel to the ground to entrain the nuts and accompanying debris thereacross.

Ramp means are disposed in the air stream to receive the entrained nuts and comprise a grid whose longitudinal axis lies in the direction of the airstream.

The spacing of the grid is such as to permit substantial amounts of the debris to pass therethrough. Basket means are disposed at the downstream end of the ramp means and are adapted to catch the nuts as they leave the high end of the ramp means.

Backstop means also comprising a grid are disposed at the edge of the basket means remote from the ramp means, the spacing of such backstop grid being such as to retain any nuts blown over the basket means.

BRIEF DESCRIPTION OF THE DRAWINGS

FIG. 1 is a plan view of apparatus constructed according to the present invention.

FIG. 2 is a view taken on line 2—2 of FIG. 1.

FIG. 3 is a view taken on line 3—3 of FIG. 2.

FIG. 4 is a perspective view of the cleaning and catching assembly of the present invention.

DESCRIPTION OF THE PREFERRED EMBODIMENT

Referring to the drawings, my apparatus comprises a blower 10 mounted at the rear of a tractor 12 and having a discharge conduit 14 fitted with an elbow 16 which can be turned to direct a blast or stream of air 15 in a direction normal to the path of travel of the tractor and generally parallel to the ground from which the nuts are to be harvested. Conduit 14 is adapted to direct the air at a slant along the ground such that when the air stream hits the ground, it spreads out in a fan shape and does not rise more than about two or three inches therefrom.

Positioned rearwardly and to one side of tractor 12 is a cleaning and catching assembly 18 comprising a ramp 20, a basket 22 attached to the high end 37 of ramp 20 and a backstop 24 positioned at the edge 25 of basket 22 remote from the ramp. The air blast from the conduit 14 is directed so as to blow the nuts across the ground, up ramp 20 and into basket 22. Backstop 24 retains any nuts that might be blown over or beyond basket 22. Leaves, trash and other debris fall through the grid of which the ramp is constructed and/or pass through or over backstop 24, thus enabling the apparatus to perform both harvesting and cleaning.

When the apparatus is used to harvest walnuts, ramp 20 is preferably made of ¼ inch diameter metal rods 26 spaced approximately one inch on centers and oriented with their longitudinal axes in the direction of the air stream 15.

A pair of side vanes or retainers 28 also made of spaced parallel rods 30 are positioned on each side of ramp 20 and attached to the framework 32 thereof. Retainers 28 are so placed to keep the nuts from being blown off the side of ramp 20. The longitudinal axes of rods 30 lie generally in the direction of the airstream 15.

A first flap 34 is attached to framework 32 below ramp 20 and at the low end 36 thereof. A second flap 38 is attached to framework 32 beneath ramp 20 and adjacent the high end 37 thereof. Flaps 34 and 38 are helpful in directing the airstream 15 parallel to the plane of ramp 20 so as to propel the nuts therealong.

The spacing of rods 26 permits an enormous amount of dirt, trash and debris to pass through the grid of ramp 20 as the nuts are blown up to basket 22. In this manner the nuts are automatically cleaned prior to falling into the basket. Ramp 20 may be constructed of any form of metal latticework or of any gridlike construction having openings sufficient to permit debris to pass through.

As mentioned previously, a 1-inch spacing for the rods is suitable for the harvesting of walnuts. Should the apparatus be used to harvest other crops, however, the spacing of the rods would have to vary, being spaced differently when used to harvest filberts, almonds or pecans, and being spaced further apart when harvesting prunes or any larger product.

The open gridlike construction in ramp 20 is also advantageous in getting the nuts to go up the ramp. A similar ramp made of solid plywood, for example, would cause the nuts to veer from their straight path, thereby to cause the apparatus to function less efficiently.

Basket 22 is formed of a metal mesh and is supported by framework 32 at the high end 37 of ramp 20 such that the discharge end of the ramp is in register with the receiving edge 40 of the basket. Thus the airstream 15 can blow the nuts across the ground, up ramp 20 and into basket 22. The basket 22 is preferably made as wide as ramp 20, which is 6 feet in the apparatus I constructed. A preferred set of dimensions for basket 22 is 14 inches in the direction of the airstream by 10 inches deep.

Backstop 24 is also formed of a gridlike construction and comprises spaced parallel, generally vertical metal rods 42 supported in a frame 44 1 inch on centers in the case of apparatus for harvesting walnuts. The purpose of the backstop is to retain any nuts that are blown over basket 22 and the spacing of rods 42 is set with this in mind. When there are leaves that follow the nuts up ramp 20, such have a tendency, since they are lighter than the nuts, to blow over basket 22 and over backstop 24. For this reason the backstop is slanted slightly outwardly, in the direction of airstream 15, to permit the leaves to blow over the top and yet to catch any nuts that are blown over the basket.

The height of backstop 24 depends on the force of airstream 15. Should a large amount of air be needed to harvest the nuts, a high backstop will be necessary such that nuts that do go over basket 22 can roll up rods 42 until they lose their momentum, whereupon they can roll back into basket 22.

Since the strongest part of airstream 15 is directly in front of blower 10, nuts caught in the weaker parts of the blast tend to blow forward (in the direction or path of travel of tractor 12) or only travel a short distance up ramp 20. To keep the airstream from hitting nuts until the strongest part can entrain them, I have attached a rod 50 from the blower framework 52 to the upstream front edge of ramp 20.

Rod 50 is mounted 6 inches above the ground and is provided with a heavy piece of belting 54 running straight down to the ground, which belting serves as a flap parallel to the airstream and adjacent its forward edge. Belting 54 keeps the airstream from blowing forward (in the direction or path of travel of tractor 12) and is so adjusted that by the time it passes over nuts on the ground, the nuts are in the middle of the blast and feel its full effect. Belting 54 also serves to dislodge any nuts embedded in the mud.

Normally when the equipment is used on the back of a tractor, the tractor is run backwards so that the nuts are blown across the path thereof. Such eliminates the possibility of running over any nuts. If the apparatus is mounted on a self-propelled vehicle, the blower should preferably be placed to the front and to one side, with the cleaning and catching assembly placed as far as possible on the other side and also in front.

In the foregoing description the invention has been described with reference to certain particular preferred embodiments, although it is to be understood that the specific details shown are merely illustrative and that the invention may be carried out in other ways without departing from the true spirit and scope of the following appended claims.

I claim:

1. Mobile apparatus for harvesting and cleaning nuts and the like, comprising means blowing a stream of air generally parallel to the ground to entrain nuts and accompanying debris and carrying the same across a predetermined area of said ground for elevation without additional mechanical lifting means; transporting means on which said blowing means is mounted, said blowing means directing said airstream normal to the path of said transporting means over said predetermined ground area;

ramp means disposed in said airstream for receiving said entrained nuts, said ramp means comprising a grid, the longitudinal axis of said grid being in the direction of said airstream, the spacing of said grid being such as to retain said nuts thereon and permit them to climb said ramp means while entrained in said airstream, said spacing permitting substantial amounts of said debris to pass therethrough; and basket means disposed at the downstream end of said ramp means for catching said nuts as they leave the high end of said ramp means.

2. Mobile apparatus as in claim 1 in which said grid comprises a plurality of parallel spaced rods, the longitudinal axes of said rods being in the direction of said airstream.

3. Mobile apparatus as in claim 1 further comprising flap means beneath said grid for directing said airstream parallel to the plane thereof.

4. Mobile apparatus as in claim 1 further comprising retaining means on each side of said grid for retaining said nuts thereon.

5. Mobile apparatus as in claim 4 in which said nut retaining means comprise a plurality of rods, the longitudinal axes of which lie generally in said direction of said airstream.

6. Mobile apparatus as in claim 1 further comprising backstop means at the edge of said basket means remote from said ramp means, said backstop means comprising a generally vertical grid, the spacing of said backstop grid being such as to retain nuts blow over said basket means.

7. Mobile apparatus as in claim 6 in which said backstop grip comprises a plurality of generally vertical, parallel spaced rods.

8. Mobile apparatus as in claim 6 in which said backstop grid is slanted in the direction of said airstream.

9. Mobile apparatus as in claim 1 further comprising flap means between said blower means and the upstream edge of said ramp means, said flap means being parallel to said airstream and positioned adjacent at least one edge thereof.

* * * * *